No. 789,152.

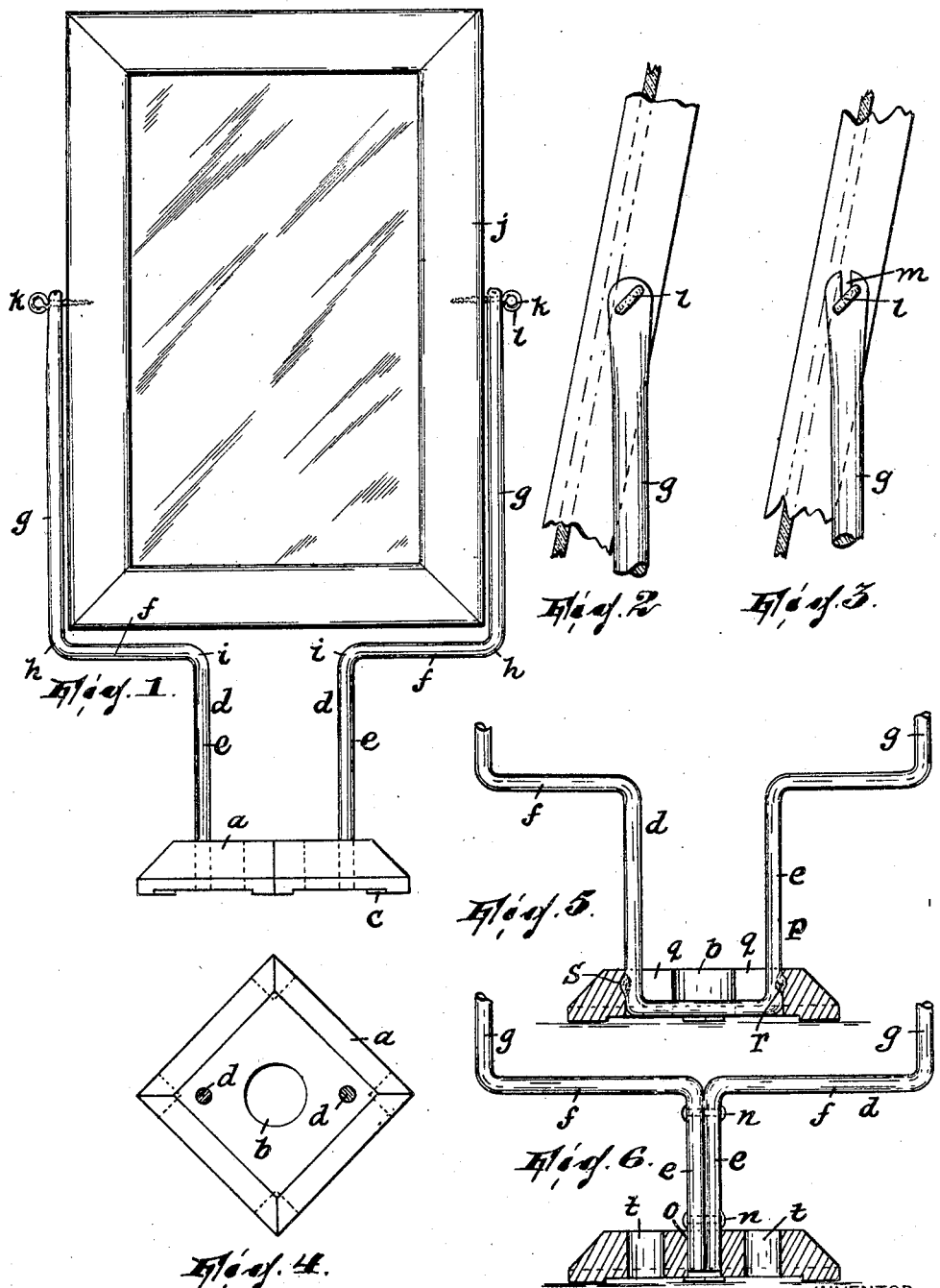

Patented May 9, 1905.

UNITED STATES PATENT OFFICE.

RALPH G. HASBROUCK, OF PATERSON, NEW JERSEY.

MIRROR.

SPECIFICATION forming part of Letters Patent No. 789,152, dated May 9, 1905.

Application filed September 29, 1904. Serial No. 226,423.

*To all whom it may concern:*

Be it known that I, RALPH G. HASBROUCK, a citizen of the United States, residing in Paterson, in the county of Passaic and State of New Jersey, have invented certain new and useful Improvements in Mirrors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to portable mirrors; and it contemplates providing a mirror cheaper and more compact in construction and lighter and more convenient to handle than mirrors at present in use.

A mirror constructed after the principle of my invention will be found very useful in shaving and other similar applications where adjustment, stability, and the adaptability to small space in packing are desired.

My invention will be found fully illustrated in the accompanying drawings, wherein—

Figure 1 is a front view thereof. Fig. 2 is a substantially full-sized fragmentary side view of the mirror. Fig. 3 is a view like Fig. 2, except that it shows a modification. Fig. 4 is a horizontal sectional view taken just above the base; and Figs. 5 and 6 are views of modified forms of the stand, each view showing said stand partly in side elevation and partly in section.

$a$ is the base, the same being preferably formed of metal, so as to be relatively heavy, and being square in shape. An opening $b$ may or may not be formed vertically in the base $a$, such opening being principally designed to save material. At the four corners and on the under side the base is formed with integral feet $c$, whereby it can be made to set more evenly on a flat surface than if the bottom of said base were smooth.

$d$ represents two uprights formed of cross-sectionally round rod-iron and each extending first vertically, as at $e$, then horizontally, as at $f$, and then vertically again, as at $g$, the angles at $h$ and $i$ being preferably sharp right angles. These uprights are set so that their horizontal portions $f$ project in opposite directions and their vertical portions $g$ are spaced but barely more than the mirror $j$, which is rectangular in shape, is wide. Said mirror is supported in the uprights $d$ by thumb-screws $k$, which are screwed into the sides of the mirror and penetrate the upper ends of the uprights $d$, their heads $l$ being adapted when the thumb-screws are screwed in to force the portions $g$ of the uprights $d$ against the sides of the mirror, and so clamp the same at any angle. The angles $h$ being sharp right angles and the portions $g$ of the uprights being but slightly more spaced than the mirror is wide a considerable bearing-surface for said portions $g$ against the sides of the mirror is afforded, so that the mirror will be held at the desired angle without the necessity of screwing in the thumb-screws to an undue extent.

The upper ends of the uprights $d$ may be provided with slots or notches $m$ to receive the thumb-screws $k$, so that, if desired, the mirror may be removed from its stand without entirely removing the thumb-screws from the mirror. The uprights $d$ may be set at their lower ends in the base $a$ in spaced relation, or they may be secured against each other in their portions $e$ by rivets $n$, as shown in Fig. 6, in which case the portions $e$ are fitted into a central opening $o$ in the base $a$, or they may be formed as one continuous or integral piece, as seen in Fig. 5. In this last instance the U-shaped part $p$ thus formed is inserted in sockets $q$, formed in diametrically opposite sides of the opening $b$, and it has on its outer sides, as at $r$, knobs or projections adapted to fit into recesses $s$ in the ends of said sockets to hold the two parts of the stand together. By grasping the U-shaped portion $p$ in the hand and pressing the uprights $d$ together the knobs $r$ will be released from said recesses, so that the two parts of the stand may be separated, as for packing in small space.

$t$ in Fig. 6 represents openings having the same purpose as the opening $b$ in Fig. 4.

It will be observed that in each instance the uprights $d$ are set in the base $a$ diagonally, so that the whole device rests firmly on its base and the danger of upsetting it is reduced. It will be also observed that in all of the forms of my invention the lower portions of the uprights are brought close together for some distance above the base. This gives a good substantial handhold, and when taken with the feature involved in giving the upper portions *g* of the uprights a considerable contact with the sides of the mirror, so that the same may be held at any desired angle in the stand, makes the device a convenient and graceful hand implement.

Having thus fully described my invention, what I claim as new, and desire to secure by Letters Patent, is—

1. The combination of a rectangular mirror, a base, a pair of uprights projecting upwardly from said base and extending first vertically, then horizontally in opposite directions and then again vertically, the bends between the horizontal and upper vertical portions of said uprights being right-angular bends, and adjusting thumb-screws mounted in the sides of said mirror and pivoted in said uprights, said uprights having their upper vertical portions spaced approximately the same as the mirror is wide, substantially as described.

2. The combination of a mirror, a base, a pair of uprights projecting upwardly from said base and extending first vertically, then horizontally in opposite directions and then again vertically, and adjusting thumb-screws mounted in the sides of said mirror and pivoted in said uprights, said uprights having their lower ends formed as a U-shaped body having knobs on its outer sides and said base having recessed sockets adapted to receive said body and interlock therewith, substantially as described.

In testimony that I claim the foregoing I have hereunto set my hand this 28th day of September, 1904.

RALPH G. HASBROUCK.

Witnesses:
JOHN W. STEWARD,
ROBERT J. POLLITT.